(12) United States Patent
Islam et al.

(10) Patent No.: US 6,334,168 B1
(45) Date of Patent: Dec. 25, 2001

(54) METHOD AND SYSTEM FOR UPDATING DATA IN A DATA STORAGE SYSTEM

(75) Inventors: Shah Mohammad Rezaul Islam, Cary; Linda Ann Riedle; Philip Anthony Richardson, both of Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,413

(22) Filed: Feb. 19, 1999

(51) Int. Cl.$^7$ ................................................. G06F 12/00
(52) U.S. Cl. .................... 711/113; 711/111; 711/112; 711/114; 711/4; 714/6
(58) Field of Search ................... 711/4, 111–114, 711/141–143; 714/1, 6, 13

(56) References Cited

U.S. PATENT DOCUMENTS

| | | | |
|---|---|---|---|
| 5,408,644 | * | 4/1995 | Schneider et al. .................... 395/575 |
| 5,794,069 | | 8/1998 | Chisholm et al. .................... 395/82.2 |
| 6,018,778 | * | 1/2000 | Stolowitz .............................. 710/61 |
| 6,052,799 | * | 4/2000 | Li et al. ................................. 714/13 |

\* cited by examiner

*Primary Examiner*—Matthew Kim
*Assistant Examiner*—Pierre M. Vital
(74) *Attorney, Agent, or Firm*—Bracewell & Patterson, LLP

(57) ABSTRACT

A method and system for a data storage system to update stored data with received data in a cache associated with the data storage system where the data storage system comprises N data storage drives is provided, where data and calculated parity are striped across the N data storage drives. An associated cache is provided with the data storage system for receiving data. The data in the cache is periodically examined to determine if the data includes all sequential data contained within a complete stripe within the data storage system. Data is fetched from the N data storage drives into the cache and the parity for the stripe is calculated by logically combining the received data in the cache and fetched data from the data storage drives if the cache is determined not to include all sequential data contained within the complete stripe. Alternatively, the parity for the stripe is calculated by logically combining only data within the cache for the stripe, if data in the cache is determined to include all sequential data contained within a complete stripe, thereby minimizing the number of input/output operations required to update data.

14 Claims, 5 Drawing Sheets

METHOD AND SYSTEM FOR UPDATING DATA IN A DATA STORAGE SYSTEM

CROSS-REFERENCE TO RELATED APPLICATIONS

The present application is related to the following copending applications, which are filed on even date herewith and incorporated herein by reference:

(1) U.S. patent application Ser. No. 09/253,414; and (2) U.S. patent application Ser. No. 09/253,415.

BACKGROUND OF THE INVENTION

1. Field of the Invention

The present invention relates in general to improved data storage systems and in particular to an improved method and system for updating stored data in a data storage system. Still more particularly, the present invention relates to an improved method and system for increasing performance of a data storage system in updating stored data utilizing contiguous data in a cache associated with the data storage system.

2. Description of the Related Art

As the performance of microprocessor and semiconductor memory technology increases, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Inexpensive Disks (RAID), International Conference on Management of Data, pgs. 109–116, June 1988. This paper laid the foundation for the use of redundant arrays of inexpensive disks that would not only improve the data transfer rate and data I/O rate over a comparable single disk access, but would also provide error correction at a lower cost in data storage systems.

RAID includes an array of disks which are typically viewed by a host, such as a computer system, as a single disk. A RAID controller may be a hardware and/or software tool for providing an interface between the host and the array of disks. Preferably, the RAID controller manages the array of disks for storage and retrieval and can view the disks of the RAID separately. The disks included in the array may be any type of data storage systems which can be controlled by the RAID controller when grouped in the array.

The RAID controller is typically configured to access the array of disks as defined by a particular "RAID level." The RAID level specifies how the data is distributed across the disk drives and how error correction is accomplished. In the paper noted above, the authors describe five RAID levels (RAID Level 1–RAID level 5). Since the publication of the paper, additional RAID levels have been designated.

RAID levels are typically distinguished by the benefits included. Three key benefits which may be included in a RAID level are fault tolerance, data availability and high performance. Fault tolerance is typically achieved through an error correction method which ensures that information can be reconstructed in the event of a disk failure. Data availability allows the data array to continue to operate with a failed component. Typically, data availability is achieved through a method of redundancy. Finally, high performance is typically achieved by simultaneous access to multiple disk drives which results in faster I/O and data transfer requests.

Error correction is accomplished, in many RAID levels, by utilizing additional parity data stored with the original data. Parity data may be utilized to recover lost data due to disk failure. Parity data is typically stored on one or more disks dedicated for error correction only, or distributed over all of the disks within an array.

By the method of redundancy, data is stored in multiple disks of the array. Redundancy is a benefit in that redundant data allows the storage system to continue to operate with a failed component while data is being replaced through the error correction method. Additionally, redundant data is more beneficial than back-up data because back-up data is typically outdated when needed whereas redundant data is current when needed.

In many RAID levels, redundancy is incorporated through data interleaving which distributes the data over all of the data disks in the array. Data interleaving is usually in the form of data "striping" in which data to be stored is broken down into blocks called "stripe units" which are then distributed across the array of disks. Stripe units are typically predefined as a bit, byte, block or other unit. Stripe units are further broken into a plurality of sectors where all sectors are an equivalent size. A "stripe" is a group of corresponding stripe units, one stripe unit from each disk in the array. Thus, "stripe size" is equal to the size of a stripe unit times the number of data disks in the array.

In an example, RAID level 5 utilizes data interleaving by striping data across all disks and provides for error correction by distributing parity data across all disks. For each stripe, all stripe units are logically combined with each of the other stripe units to calculate parity for the stripe. Logical combination is typically accomplished by an exclusive or (XOR) of the stripe units. For N physical drives, N−1 of the physical drives will receive a stripe unit for the stripe and the Nth physical drive will receive the parity for the stripe. For each stripe, the physical drive receiving the parity data rotates such that all parity data is not contained on a single disk. I/O request rates for RAID level 5 are high because the distribution of parity data allows the system to perform multiple read and write functions at the same time. RAID level 5 offers high performance, data availability and fault tolerance for the data disks.

Disk arrays are preferably configured to include logical drives which divide the physical drives in the disk array into logical components which may be viewed by the host as separate drives. Each logical drive includes a cross section of each of the physical drives and is assigned a RAID level. For example, a RAID system may include 10 physical drives in the array. The RAID system is accessible by a network of 4 users and it is desirable that each of the users have separate storage on the disk array. Therefore the physical drives will be divided into at least four logical drives where each user has access to one of the logical drives. Logical drive 1 needs to be configured to RAID level 5. Therefore, data will be interleaved across the cross sections of nine of the physical drives utilized by logical drive 1 and parity data will be stored in the cross section of the remaining physical drive.

A host computer may provide data to the data storage system. The data is preferably received into a cache of the RAID controller. When data is received into the cache, the RAID controller may return a signal to the host computer that the data has been received even though the data has not been stored in the physical drives of the data storage system. By receiving data into the cache before storage as stripes in the data storage system, the performance of the data storage system may be enhanced.

Data for updating previously stored data is considered "dirty data" until the dirty data is written to the data disks.

The dirty data in the cache may include sufficient data to completely update at least one stripe or may include portions of data to update portions of multiple stripes. Each data stripe unit of dirty data is contained within a page of the cache.

Before dirty data may be written to the data disks, parity data for the stripe, which includes the dirty data, must be calculated to maintain error correction. By one method, for each new page of dirty data, the old stripe unit and parity for the stripe must be fetched from the data disks into pages of the cache, the parity calculated and the dirty stripe unit and parity written to the appropriate physical drives for the stripe. For most parity calculation methods, two reads are required from the stripe to fetch the necessary data into pages of the cache. Thereafter, for writing to the data disks, the dirty data and newly calculated parity data utilize two writes for each page of dirty data. Regardless of the existence of other data in the cache, in the prior art, each page of dirty data is written independently.

However, if all dirty data for a complete stripe is in the cache, all the data needed to calculate new parity is already in the cache.

It should therefore be apparent that a need exists for an improved method and system which permits updating of data stripes with a minimum number of input/output operations by considering whether or not related data is present within the cache.

SUMMARY OF THE INVENTION

It is therefore one object of the present invention to provide an improved data storage system.

It is another object of the present invention to provide an improved method and system for updating stored data in a data storage system.

It is yet another object of the present invention to provide an improved method and system for increasing the performance of a data storage system in updating stored data with received data utilizing contiguous data within a cache associated with the data storage system.

The foregoing objects are achieved as is now described. The method and system of the present invention may be utilized in a data storage system to update stored data with received data in a cache associated with the data storage system where the data storage system comprises N data storage drives, where data and calculated parity are striped across the N data storage drives. An associated cache is provided with the data storage system for receiving data. The data in the cache is periodically examined to determine if the data includes all sequential data contained within a complete stripe within the data storage system. Data is fetched from the N data storage drives into the cache and the parity for the stripe is calculated by logically combining the received data in the cache and fetched data from the data storage drives, if the cache is determined not to include all sequential data contained within the complete stripe. Alternatively, the parity for the stripe is calculated by logically combining only data within the cache for the stripe, if data in the cache is determined to include all sequential data contained within a complete stripe, thereby minimizing the number input/output operations required to update data.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
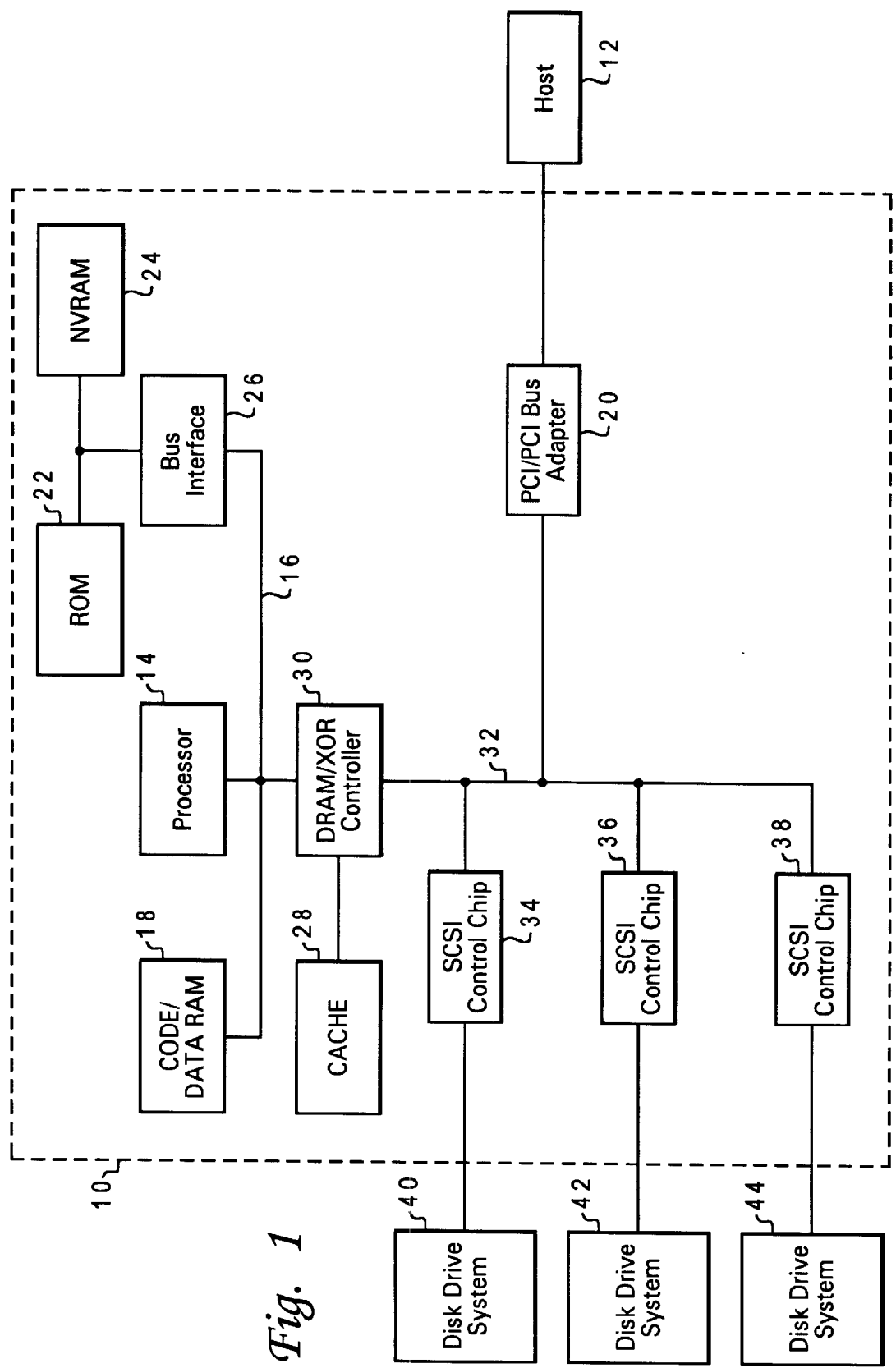
FIG. 1 depicts a high level block diagram of a data storage system which may be utilized according to the method and system of the present invention.

With reference now to the figures and in particular with reference to FIG. 1, there is depicted a high level block diagram of a RAID data storage system which may be utilized to implement the present invention. As depicted, RAID data storage system 10 is coupled to host processor 12 via PCI/PCI bus adapter 20. The data storage system 10 and host processor 12 may be incorporated in a single data processing system hardware unit, such as a general purpose digital computer (not shown). Alternatively, data storage system 10 may be incorporated into one data processing system hardware unit and host processor 12 may be incorporated into another data processing system hardware unit, such as a general purpose digital computer (not shown).

Host processor 12 may be implemented in a variety of data processing systems under a number of different operating systems. The data processing system may be, for example, a personal computer, a mini-computer, or a mainframe computer. The data processing system may be a stand-alone system or part of a network such as a local area network (LAN) or a wide area network (WAN).

As illustrated, processor 14 is utilized to control data storage system 10 which is preferably a RAID data storage system. Processor 14 is preferably an advanced microprocessor which is coupled to processor bus 16. As depicted, also coupled to processor bus 16 is code/data RAM 18 which is utilized to temporarily store code and data utilized by processor 14. ROM 22 and non-volatile random access memory (NVRAM) 24 are typically accessed utilizing an 8 bit bus and thus bus interface 26 is utilized to interface those devices to processor bus 16, which typically utilizes a 32 bit bus.

Operational code is typically stored within ROM 22, which, as those skilled in the art will appreciate, is generally provided utilizing so-called "flash" ROM. Operational code is thereafter fetched from ROM 22 by processor 14 upon initiation of operation to direct the operation of processor 14 to perform functions including the functions of the present invention. NVRAM 24 is typically a low power CMOS memory which is powered up for "back-up" by a battery such that the information stored in NVRAM 24 will not be lost when main power is terminated. Thus, NVRAM 24 may be utilized to store configuration data or operational code in a manner similar to that stored within ROM 22. ROM 22 is generally updated at initial power application and any changes to system configuration during operation are stored within NVRAM 24 and then entered into a "device change list" which is also stored within NVRAM 24 and on each disk drive within the system.

A cache 28 is also provided which is coupled to DRAM/XOR controller 30. Cache 28 may be configured into a plurality of temporary storage positions for data. DRAM/XOR controller 30 is utilized to control access to random access memory and also provides a hardware implemented exclusive or (XOR) circuit which may be utilized to rapidly and efficiently calculate parity for changes in updated data.

DRAM/XOR controller 30 is coupled to local bus 32. Also coupled to local bus 32 are multiple small computer system interface (SCSI) control chips 34, 36 and 38. Each SCSI control chip 34, 36 and 38 is defined as including channels which may each support a disk drive storage system comprising a plurality of disks. Those having ordinary skill in this art will appreciate that alternative bus architectures may be utilized to implement the data storage system; however, the depicted embodiment of the present invention utilizes multiple disk drive data storage systems 40, 42 and 44 which are configured in the SCSI bus architecture.

Figure 2:
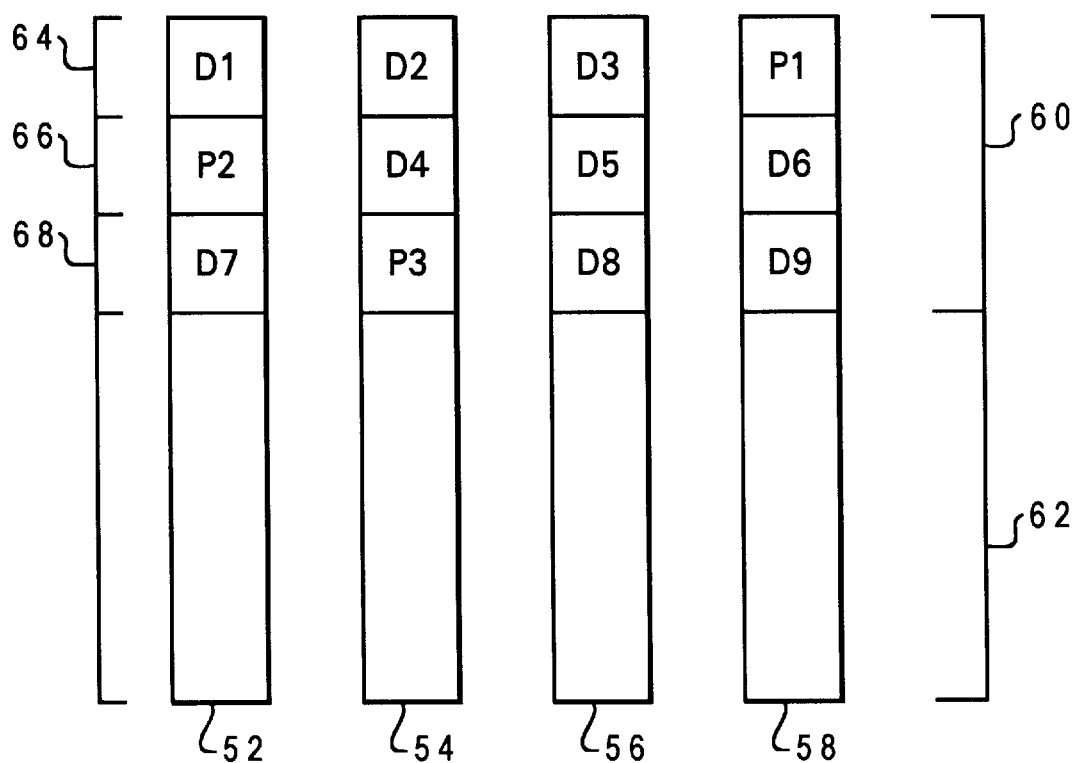
FIG. 2 illustrates a pictorial image of a RAID disk storage system according to the method and system of the present invention.

Referring now to FIG. 2, there is illustrated a pictorial image of a RAID-5 disk drive system of the present invention. In the example shown, four physical drives 52, 54, 56 and 58 are depicted. A logical drive is distinguished as a cross section of the four physical drives 52, 54, 56 and 58 as illustrated at reference numeral 60. The remainder of the physical drives 52, 54, 56 and 58 depicted at reference numeral 62 may contain a plurality of stripes and/or distinguished logical drives. Three stripes are illustrated at reference numerals 64, 66, and 68 within the logical drive depicted at reference numeral 60. The portion of the cross-section of each physical drive is a stripe unit.

For a RAID-5 data disk system shown, for the logical disk depicted at reference numeral 60, each stripe includes three stripe units of-data which are labeled with a "D" and a stripe unit of parity which is labeled with a "P". Finally, the stripe depicted at reference numeral 64 includes stripe units D1, D2, D3, and P1. The stripe illustrated at reference numeral 66 includes stripe units D4, D5, D6 and P2. The stripe depicted at reference numeral 68 includes stripe units D7, D8, D9 and P3. For other RAID levels, the distribution of data and parity will conform to the RAID level specifications.

Figure 3:
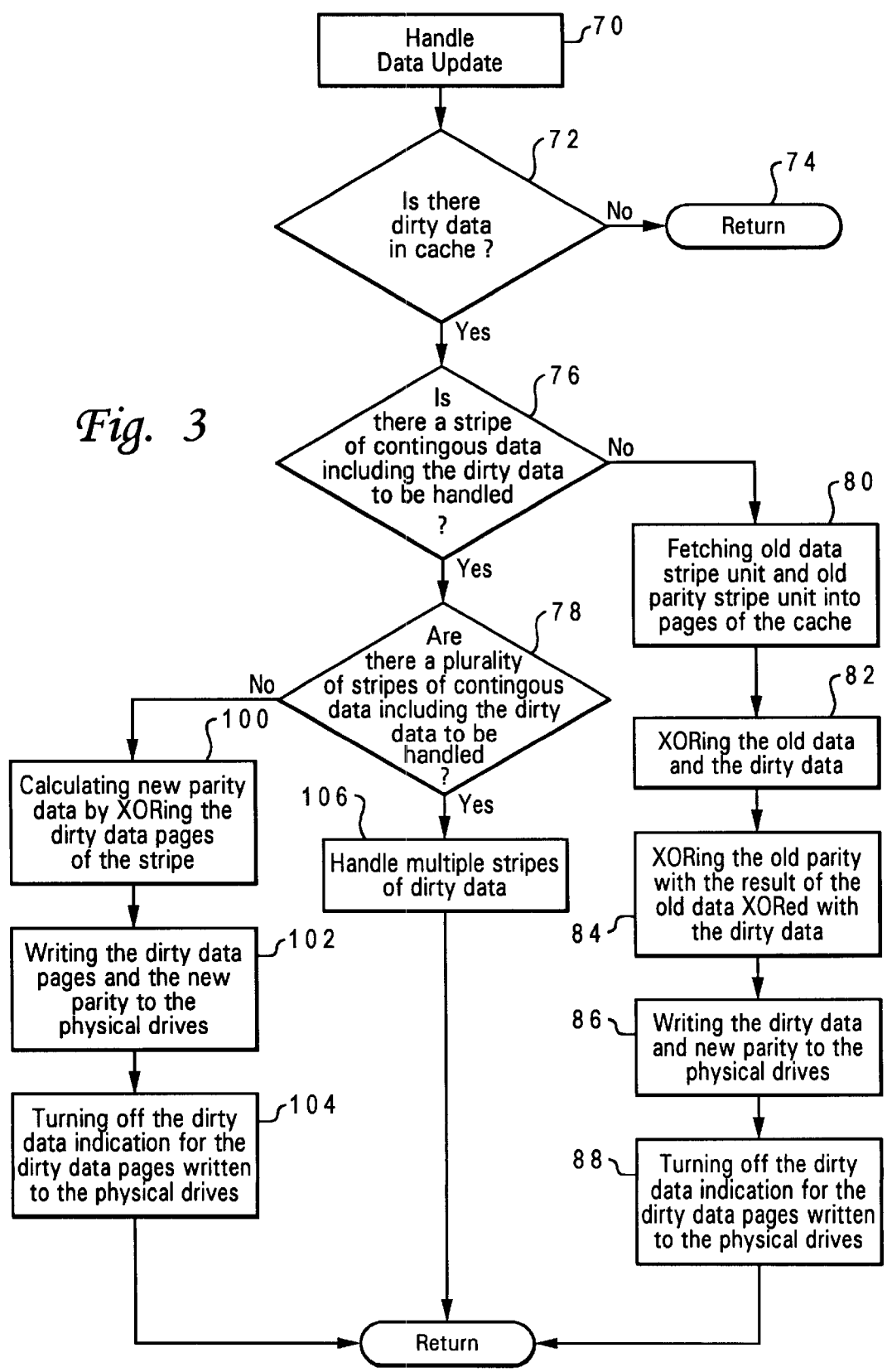
FIG. 3 depicts a high level logic flowchart which illustrates the method of the present invention according to the method and system of the present invention.

With reference now to FIG. 3, there is depicted a high level logic flowchart which illustrates the method of the present invention. It should be appreciated by those skilled in the art that FIG. 3 represents a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data processing systems such as general purpose digital computers or other similar devices including data storage system 10. In all cases the distinction between the method operations and operating a computer and the method of computation itself should be born in mind.

The present invention relates to method steps for operating a processor such as processor 14 of FIG. 1, in processing electrical or other physical signals to generate desired physical signals. As illustrated, the process described in FIG. 3 begins at block 70 and thereafter passes to block 72. Multiple triggers in the operation of processor 14 may initiate the process which begins at block 70.

Block 72 depicts a determination of whether or not there is a page of dirty data present within the cache which has not been updated in the physical drives. In the event that a page of dirty data is present within the cache as determined at block 72, the process passes to block 76. Otherwise, if no page of dirty data is present within the cache, the process passes to block 74 and returns to a previous process of the processor 14, as depicted at block 74.

Block 76 illustrates a determination of whether or not an entire stripe of contiguous data present within the cache, including the page of dirty data, is to be handled. For an entire stripe of contiguous data to be present in the cache, including the page of dirty data, there must be a direct correlation between each data stripe unit in the stripe and a page of data in the cache. In the event that there is not an entire stripe of contiguous data pages present within the cache, including the page of dirty data, to be handled, the process passes to block 80.

Block 80 depicts the fetching of an old data stripe unit and an old parity stripe unit into pages of the cache. The old data stripe unit is the stripe unit that the page of dirty data will update and the old parity stripe unit is the parity of the stripe containing the page of dirty data to be updated. Thereafter, block 82 illustrates the calculating of the logical combination of the fetched old data and the dirty data. Typically, this logical combination is calculated by XORing the data as previously described; however, in other embodiments, other logical combinations of data may be utilized. Next, the process passes from block 82 to block 84. Block 84 depicts calculating the new parity by the logical combination of the fetched old parity with the result of the previous logical combination of the fetched old data with the dirty data. Thereafter, the process passes from block 84 to block 86. Block 86 illustrates writing of the dirty data and the new parity to proper positions in the data storage drives for updating the stripe. Next, the process passes from block 86 to block 88. Block 88 depicts the turning off of the dirty data indication for the pages of dirty data written to the physical drives from the cache.

In the event that there is an entire stripe of contiguous data present within the cache, including the page of dirty data to be handled, the process passes from block 76 to block 78. Block 78 illustrates a determination of whether or not there are multiple contiguous stripes of data present within the cache including the dirty data to be handled. If not, the process passes to block 100 to calculate parity for a single stripe. If so, the process passes to block 106 to calculate parity for multiple stripes.

Block 100 illustrates the calculating of the new parity by logically combining the contiguous data pages of the stripe in the cache. Thereafter, the process passes from block 100 to block 102. Block 102 depicts the writing of pages of dirty data and newly calculated parity for the stripe from the cache to the physical drives. Thereafter, the process passes from block 102 to block 104. Block 104 illustrates the turning off of the dirty data indication for each of the pages of dirty data written to the physical drives from the cache.

Figure 4:
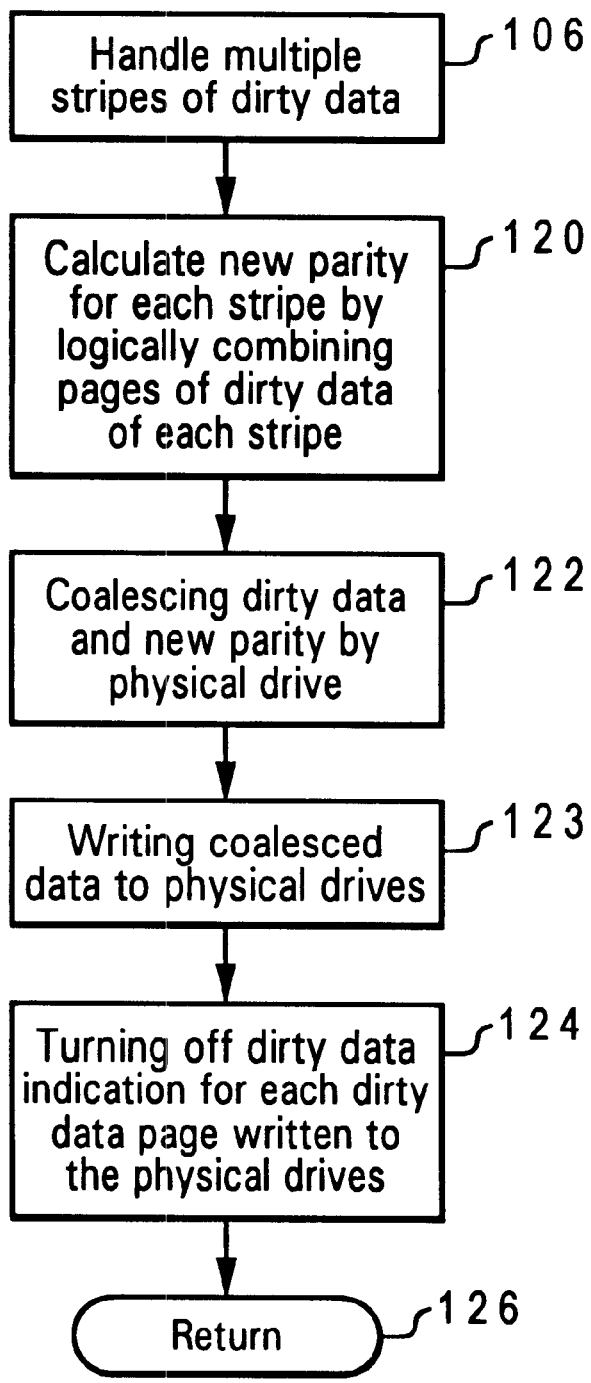
FIG. 4 illustrates a high level logic flowchart which illustrates the method of the present invention in handling multiple contiguous stripes of dirty data according to the method and system of the present invention.

Referring now to FIG. 4, there is depicted a high level logic flowchart which illustrates the method of the present invention. Specifically, the high level logic flowchart illustrates the process entered from block 106 of FIG. 3 to handle multiple stripes of dirty data. Block 120 depicts the calculating of new parity for each stripe by logically combining all contiguous data pages for each stripe. Thereafter, the process passes from block 120 to block 122. Block 122 illustrates the coalescing of data pages for each physical drive. Next, the process passes from block 122 to block 123. Block 123 depicts the writing of the coalesced data to each physical drive. Thereafter, the process passes from block 123 to block 124. Block 124 depicts the turning off of the dirty data indication for each page of dirty data and newly calculated parity written from the cache to the physical drives. Finally, the process returns to block 106 of FIG. 3 as illustrated at block 126 and thereafter returns as illustrated at block 108.

Figure 5:
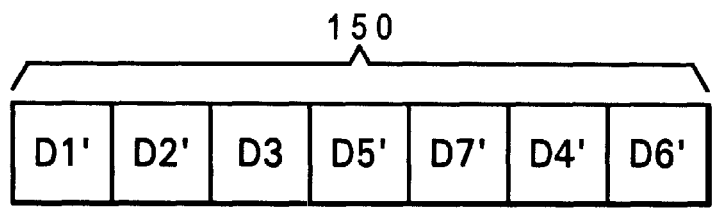
FIG. 5 depicts a pictorial illustration of data received into the cache of the data storage system according to the method and system of the present invention.

With reference now to FIG. 5, there is depicted a pictorial illustration of data received into the cache of the data storage system. Typically, each stripe unit is represented by a page in the cache. In the example, seven pages of data within a cache are depicted at reference numeral 150, where each block represents a page correlating to a stripe unit in the physical drives. A textual label "'" following the identification of the data in a data page is the indication of dirty data in the data page. In the example, there is dirty data in six of the pages shown which needs to be utilized to update the old data stored on the physical drives. The page indicating D3 is not a page of dirty data. Before updating previously stored data, the parity for the stripe is recalculated in the cache such that the newly calculated parity may be written to the physical drives with the dirty data.

Figure 6:
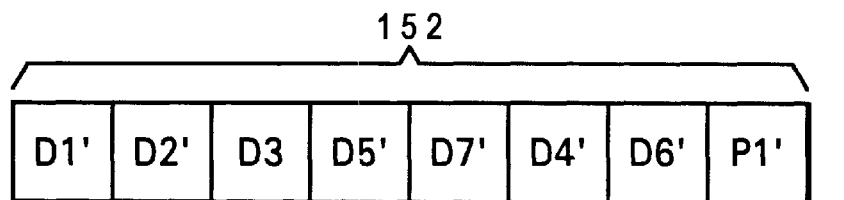
FIG. 6 illustrates a pictorial illustration of parity calculated and stored in a cache of the data storage system according to the method and system of the present invention.
Figure 7:
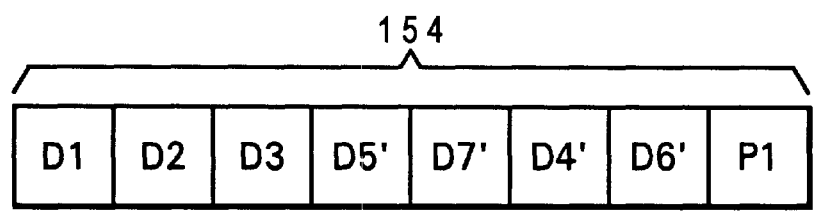
FIG. 7 depicts a pictorial illustration of data in a cache after dirty data has been written to the data storage disks according to the method and system of the present invention.

Referring now to FIGS. 5–7, there are depicted pictorial illustrations of data received into the cache of the data storage system and the steps of the cache in calculating parity for a portion of the dirty data received. In the example of FIG. 6, eight pages of data within a cache are depicted at reference numeral 152 where the last page is added to the cache of FIG. 5 as a result of the operations to be described. With reference still to FIG. 6, the dirty data to be first updated is D1' of the first stripe. For a contiguous stripe of data to be in the cache which includes D1', then D2 and D3 would also need to be in the cache. Since D2' and D3 are also in the cache, the new parity can be calculated without fetching from the physical drives. The new parity, P1', is calculated by XORing D1', D2' and D3 which results in P1'. P1' is stored in a page in the cache as illustrated in the cache at reference numeral 153. D1', D2' and P1' are written to the physical drives to update the first stripe. Afterward, the dirty data indicator ' of D1', D2' and P1' is turned off in the cache as depicted in the cache at reference numeral 154 of FIG. 7. The result of updating D1' and D2' together by the single stripe method is the utilization of 3 writes to the disk drives and 1 XOR calculation. If each page of dirty data is updated page by page, the result of updating D1' and D2' would be a minimum of 2 reads and a maximum of 4 reads from the disk drives. Additionally, updating page by page would require 4 writes to the disk drives and 2 XOR calculations.

Referring back to FIG. 5, the data in the cache includes dirty data for multiple contiguous stripes. The first dirty data to be updated is D1' of the first stripe. In addition, D2', D4', D5', and D6' are included in pages of dirty data which need to be updated. For multiple contiguous stripes of data to be in the cache which includes D1', then D2, D3, D4, D5 and D6 would also need to be in the cache where at least D4, D5 or D6 is also dirty data. For handling multiple stripes with dirty data included, new parity is calculated for each contiguous stripe of data. For the first stripe, P1' is calculated by XORing D1', D2' and D3 and is stored in a page of cache as illustrated at reference numeral 160 of FIG. 8. Following, for the second stripe, P2' is calculated by XORing D4', D5' and D6' and is stored in a page of cache as depicted at reference numeral 162. The cache as illustrated at reference numeral 156 represents the cache after P1' and P2' have been calculated and added to pages in the cache.

Figure 8:
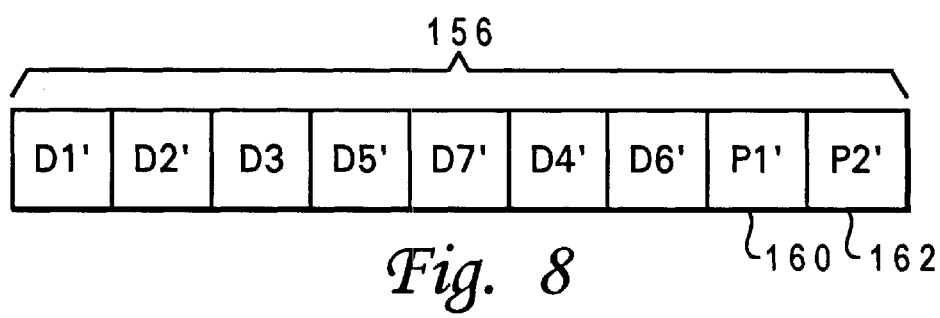
FIG. 8 illustrates a pictorial illustration of parity calculated and stored in a cache of a data storage system for multiple contiguous stripes of data received into the cache of the data storage system according to the method and system of the present invention.

Still referring to FIG. 8, and with reference to FIG. 2, four pairs of data pages D1' and P2', D2' and D4', D3 and D5', and P1' and D6' each correlate to the one of each of the physical drives illustrated. Therefore, to reduce input/output operations, the pairs are coalesced for each physical drive and written such that one write is utilized for each pair. Afterward, the dirty data indicator for each page is turned off as illustrated at reference numeral 158 of FIG. 9.

Figure 9:
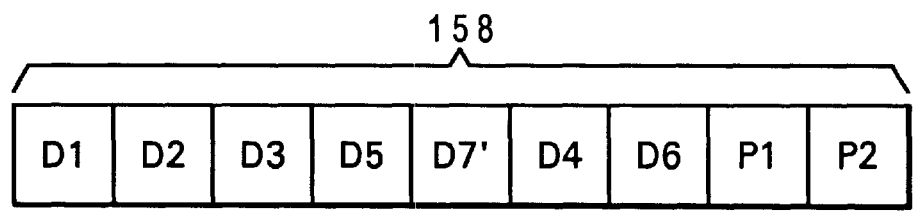
FIG. 9 depicts a pictorial illustration of the data in a cache after dirty data has been written to the data storage disks according to the method and system of the present invention.

Page by page updating of each of the five pages of dirty data in the example of FIG. 9 would take a minimum of 5 reads and a maximum of 10 reads from the disk drives. Additionally, the page by page method would require 10 writes to the disk drives and 5 XOR calculations. By calculating parity and writing the data in the example of FIG. 9 stripe by stripe, the method would use 7 writes to the data disks and 2 XOR calculations. In the embodiment described, the multiple stripe method further reduces operations and only utilizes 4 writes to the disk drives and 2 XOR calculations.

While the invention has been particularly shown and described with reference to a preferred embodiment, it will be understood by those skilled in the art that various changes in form and detail may be made therein without departing from the spirit and scope of the invention.

For example, although examples have been illustrated fog a RAID-5 data system, other RAID levels, such as RAID-0 and RAID-1, may also utilize the method and system according to the present invention.

Also, for example, although aspects of the present invention have been described with respect to a data storage system executing software that directs the method of the present invention, it should be understood that the present invention may alternatively be implemented as a computer program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method in a data storage system for updating stored data with received data in a cache associated with said data storage system, where said data storage system comprises N data storage drives, where data and calculated parity are striped across said N data storage drives for a stripe, said method comprising the steps of:

receiving data into a cache associated with said data storage system;

determining if said received data in said cache includes sequential data for a plurality of complete stripes;

calculating parity for each of said plurality of complete stripes by logically combining only said received data for each of said plurality of complete stripe if said data is sequential for each of said plurality of complete stripes;

coalescing said received data for each of said plurality of complete stripes and said calculated parity for each of said plurality of complete stripes;

calculating parity for a particular stripe by logically XORing said received data and fetched data from said data storage system if said cache is not determined to include all sequential data contained within said particular stripe, where fetched data is fetched from said N data storage drives into said cache;

coalescing said particular stripe with said plurality of complete stripes; and writing said coalesced data to each of said N data storage drives, such that input/output operations within said data storage system are minimized.

2. A method in a data storage system for updating stored data with received data in a cache associated with said data storage system according to claim 1, said method further comprising the steps of:

dividing the cache into a plurality of pages;

storing a predefined unit of said received data in each page of the cache; and associating a position in said N data storage drives with each said page of received data according to the stored data position which the received data will update.

3. A method in a data storage system for updating stored data with received data in a cache associated with said data storage system according to claim 1, said step of calculating said parity for each of said plurality of complete stripes, further comprising the step of:

XORing said received data within said cache for each of said plurality of complete stripes.

4. A system in a data storage system for updating stored data with received data in a cache associated with said data storage system, where said data storage system comprises N data storage drives, where data and calculated parity are striped across said N data storage drives for a stripe, said system comprising:

a cache associated with said data storage system for receiving data;

means for determining if said received data in said cache includes sequential data for a plurality of complete stripes;

means for calculating parity for each of said plurality of complete stripes by logically combining only said received data for each of said plurality of complete stripe if said data is sequential for each of said plurality of complete stripes;

means for coalescing said received data for each of said plurality of complete stripes and said calculated parity for each of said plurality of complete stripes;

means for calculating parity for a particular stripe by logically XORing said received data and fetched data from said data storage system if said cache is not determined to include all sequential data contained within said particular stripe, where fetched data is fetched from said N data storage drives into said cache;

means for coalescing said particular stripe with said plurality of complete stripes; and means for writing said coalesced data to each of said N data storage drives, such that input/output operations within said data storage system are minimized.

5. A system in a data storage system for updating stored data with received data in a cache associated with said data storage system according to claim 4, said system further comprising:

means for dividing the cache into a plurality of pages;

means for storing a predefined unit of said received data in each page of the cache; and means for associating a position in said N data storage drives with each said page of received data according to the stored data position which the received data will update.

6. A system in a data storage system for updating stored data with received data in a cache associated with said data storage system according to claim 4, said means for calculating said parity for each of said plurality of complete stripes further comprising:

an XOR controller for performing said calculation by logically combining said received data for each of said plurality of complete stripes.

7. A method in a RAID data storage system for updating stored data with received data in a cache associated with said RAID data storage system, where said RAID data storage system comprises N data storage drives, where data and calculated parity are striped across said N RAID data storage drives for a stripe, said method comprising the steps of:

receiving data into a cache associated with said RAID data storage system;

determining if said received data in said cache includes sequential data for a plurality of complete stripes;

calculating parity for each of said plurality of complete stripes by logically combining only said received data for each of said plurality of complete stripe if said data is sequential for each of said plurality of complete stripes;

coalescing said received data for each of said plurality of complete stripes and said calculated parity for each of said plurality of complete stripes;

calculating parity for a particular stripe by logically XORing said received data and fetched data from said RAID data storage system if said cache is not determined to include all sequential data contained within said particular stripe, where fetched data is fetched from said N RAID data storage drives into said cache;

coalescing said particular stripe with said plurality of complete stripes; and writing said coalesced data to each of said N RAID data storage drives, such that input/output operations within said RAID data storage system are minimized.

8. A method in a RAID data storage system for updating stored data with received data in a cache associated with said RAID data storage system according to claim 7, said method further comprising the steps of:

dividing the cache into a plurality of pages;

storing a predefined unit of said received data in each page of the cache; and associating a position in said N RAID data storage drives with each said page of received data according to the stored data position which the received data will update.

9. A method in a RAID data storage system for updating stored data with received data in a cache associated with said RAID data storage system according to claim 7, said step of calculating said parity for each of said plurality of complete stripes, further comprising the step of:

XORing said received data within said cache for each of said plurality of complete stripes.

10. A system in a RAID data storage system for updating stored data with received data in a cache associated with said RAID data storage system, where said RAID data storage system comprises N RAID data storage drives, where data and calculated parity are striped across said N RAID data storage drives for a stripe, said system comprising:

a cache associated with said RAID data storage system for receiving data;

means for determining if said received data in said cache includes sequential data for a plurality of complete stripes;

means for calculating parity for each of said plurality of complete stripes by logically combining only said received data for each of said plurality of complete stripe if said data is sequential for each of said plurality of complete stripes;

means for coalescing said received data for each of said plurality of complete stripes and said calculated parity for each of said plurality of complete stripes;

means for calculating parity for a particular stripe by logically XORing said received data and fetched data from said RAID data storage system if said cache is not determined to include all sequential data contained within said particular stripe, where fetched data is fetched from said N RAID data storage drives into said cache;

means for coalescing said particular stripe with said plurality of complete stripes; and means for writing said coalesced data to each of said N RAID data storage drives, such that input/output operations within said RAID data storage system are minimized.

11. A system in a RAID data storage system for updating stored data with received data in a cache associated with said RAID data storage system according to claim 10, said system further comprising:

means for dividing the cache into a plurality of pages;

means for storing a predefined unit of said received data in each page of the cache; and means for associating a position in said N RAID data storage drives with each said page of received data according to the stored data position which the received data will update.

12. A system in a RAID data storage system for updating stored data with received data in a cache associated with said RAID data storage system according to claim 10, said means for calculating said parity for each of said plurality of complete stripes further comprising:

an XOR controller for performing said calculation by logically combining said received data for each of said plurality of complete stripes.

13. A program product for updating stored data with received data in a cache associated with a data storage system, where said data storage system comprises N data storage drives, said program product comprising:

a data processing system usable medium;

a data updating program encoded within said data processing system usable medium that, in response to receiving data into said cache determines if said received data in said cache includes sequential data for a plurality of complete stripes, calculates parity for each of said plurality of complete stripes by logically combining only said received data for each of said plurality of complete stripe in response to determining that said data in said cache is sequential for each of said plurality of complete stripes, coalesces said received data for each of said plurality of complete stripes and said calculated parity for each of said plurality of complete stripes, calculates parity for a particular stripe by logically XORing said received data and fetched data from said data storage system in response to determining that said cache does not include all sequential data contained within said particular stripe, where fetched data is fetched from said N data storage drives into said cache;

coalescing said particular stripe with said plurality of complete stripes; and writes said coalesced data to each of said N data storage drives, such that input/output operations within said data storage system are minimized.

14. The program product of claim 13, wherein said data updating program:

stores a predefined unit of said received data in each page of the cache; and associates a position in said N data storage drives with each said page of received data according to the stored data position which the received data will update.

* * * * *